US012070696B2

(12) United States Patent
Thielbar et al.

(10) Patent No.: US 12,070,696 B2
(45) Date of Patent: Aug. 27, 2024

(54) REPLAYABLE ACTIVITIES FOR INTERACTIVE CONTENT TITLES

(71) Applicant: Sony Interactive Entertainment Inc., Tokyo (JP)

(72) Inventors: Christopher Thielbar, San Francisco, CA (US); Adil Sherwani, San Mateo, CA (US); Derek Parker, San Mateo, CA (US); Matt Bloom-Carlin, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/517,875

(22) Filed: Nov. 3, 2021

(65) Prior Publication Data
US 2022/0143516 A1 May 12, 2022

Related U.S. Application Data

(60) Provisional application No. 63/111,528, filed on Nov. 9, 2020.

(51) Int. Cl.
*A63F 13/86* (2014.01)
*A63F 13/497* (2014.01)
(Continued)

(52) U.S. Cl.
CPC ............ *A63F 13/86* (2014.09); *A63F 13/497* (2014.09); *A63F 13/533* (2014.09);
(Continued)

(58) Field of Classification Search
CPC ...... A63F 13/86; A63F 13/533; A63F 13/798; A63F 13/497; A63F 2300/6018; A63F 2300/634
(Continued)

(56) References Cited

U.S. PATENT DOCUMENTS 5,913,013 A 6/1999 Abecassis
8,448,095 B1 5/2013 Haussila et al.
(Continued)

FOREIGN PATENT DOCUMENTS

CN 113710337 11/2021
CN 113710340 11/2021
(Continued)

OTHER PUBLICATIONS

Li et al., "Distributed Multimedia Systems", IEEE, Jul. 1997, retrieved on [Feb. 7, 2021]. Retrieved from the internet <URL: https://citeseerx.ist.psu.edu/viewdoc/download?doi=10.1.1.128.9759&rep1&type=pdf>.
(Continued)

*Primary Examiner* — Patrick F Riegler
(74) *Attorney, Agent, or Firm* — Polsinelli LLP

(57) ABSTRACT

A system and method for creating and/or administering operation of replayable activities for interactive content titles. The replayable activities may be competitive in nature and may be used to determine a ranking. A first set of data associated with an interactive content title may be received. The first set of data associated with the interactive content title may be received from an interactive content source server. The interactive content title may be is at least partially hosted at the interactive content source server. The first set of data may be associated with a replayable activity for the interactive content title. A score may be determined based on the first set of data for an associated user account. The associated user account may be placed in the ranking based on scores of other user accounts and respective sets of data associated with the replayable activity for the interactive content title.

20 Claims, 14 Drawing Sheets

(51) Int. Cl.
*A63F 13/533* (2014.01)
*A63F 13/798* (2014.01)

(52) U.S. Cl.
CPC .... *A63F 13/798* (2014.09); *A63F 2300/6018* (2013.01); *A63F 2300/634* (2013.01)

(58) Field of Classification Search
USPC .......................................................... 463/31
See application file for complete search history.

(56) References Cited

U.S. PATENT DOCUMENTS

| | | | |
|---|---|---|---|
| 8,460,108 B2 | 6/2013 | Hendrickson et al. | |
| 8,764,555 B2 | 7/2014 | Quan et al. | |
| 8,918,728 B2 | 12/2014 | Hamilton et al. | |
| 9,155,963 B2 | 10/2015 | Baynes et al. | |
| 9,168,460 B2 | 10/2015 | Pearce | |
| 9,333,433 B2 | 5/2016 | Cotter | |
| 9,381,425 B1 | 7/2016 | Curtis et al. | |
| 9,468,851 B1* | 10/2016 | Pieron | A63F 13/792 |
| 9,795,879 B2 | 10/2017 | Colenbrander | |
| 9,930,405 B2 | 3/2018 | Peterson et al. | |
| 10,109,003 B1 | 10/2018 | Jenkins et al. | |
| 10,315,108 B2 | 6/2019 | Perry | |
| 10,564,820 B1 | 2/2020 | Cabanero et al. | |
| 10,569,164 B1* | 2/2020 | Bleasdale-Shepherd | A63F 13/53 |
| 10,843,085 B2 | 11/2020 | Stephens | |
| 10,848,805 B1 | 11/2020 | Mattar et al. | |
| 10,881,962 B2 | 1/2021 | Stephens | |
| 11,080,748 B2 | 8/2021 | Stephens | |
| 11,090,568 B1 | 8/2021 | Mattar et al. | |
| 11,213,748 B2 | 1/2022 | Jarzebinski | |
| 11,247,130 B2 | 2/2022 | Stephens | |
| 11,269,944 B2 | 3/2022 | Stephens | |
| 11,420,130 B2 | 8/2022 | Clingman | |
| 11,442,987 B2 | 9/2022 | Clingman | |
| 11,465,053 B2 | 10/2022 | Stephens | |
| 11,602,687 B2 | 3/2023 | Clingman | |
| 11,951,405 B2 | 4/2024 | Clingman | |
| 12,005,354 B2 | 6/2024 | Jarzebinski | |
| 2002/0077170 A1 | 6/2002 | Johnson et al. | |
| 2002/0183105 A1* | 12/2002 | Cannon | G07F 17/32 463/16 |
| 2004/0021684 A1 | 2/2004 | Millner | |
| 2007/0198740 A1 | 8/2007 | Peters et al. | |
| 2007/0198939 A1 | 8/2007 | Gold | |
| 2008/0045335 A1 | 2/2008 | Garbow et al. | |
| 2008/0262858 A1 | 10/2008 | Broady et al. | |
| 2009/0115776 A1 | 5/2009 | Bimbra et al. | |
| 2009/0170609 A1 | 7/2009 | Kang et al. | |
| 2009/0176557 A1* | 7/2009 | Hall | A63F 13/798 463/43 |
| 2009/0197681 A1 | 8/2009 | Krishnamoorthy et al. | |
| 2009/0276713 A1 | 11/2009 | Eddy | |
| 2010/0070613 A1 | 3/2010 | Chen et al. | |
| 2010/0105484 A1 | 4/2010 | Horneff et al. | |
| 2010/0304348 A1* | 12/2010 | Lehavi | G09B 7/02 463/1 |
| 2011/0067061 A1 | 3/2011 | Karaoguz et al. | |
| 2011/0092282 A1 | 4/2011 | Gary | |
| 2011/0113149 A1 | 5/2011 | Kaal | |
| 2011/0250971 A1* | 10/2011 | van Os | A63F 13/795 463/43 |
| 2011/0314029 A1 | 12/2011 | Fischer et al. | |
| 2011/0319229 A1 | 12/2011 | Corbalis et al. | |
| 2012/0004956 A1 | 1/2012 | Huston et al. | |
| 2012/0030123 A1 | 2/2012 | Ocko | |
| 2012/0094762 A1 | 4/2012 | Khan | |
| 2012/0115580 A1* | 5/2012 | Hornik | G07F 17/34 463/43 |
| 2012/0206574 A1 | 8/2012 | Shikata et al. | |
| 2012/0252583 A1* | 10/2012 | Mikkelsen | A63F 13/46 463/43 |
| 2012/0284292 A1 | 11/2012 | Rechsteiner et al. | |
| 2012/0309533 A1* | 12/2012 | Horita | A63F 13/211 463/36 |
| 2012/0317198 A1 | 12/2012 | Patton et al. | |
| 2012/0322561 A1 | 12/2012 | Kohlhoff | |
| 2013/0064527 A1 | 3/2013 | Maharajh et al. | |
| 2013/0084969 A1* | 4/2013 | Knoles | A63F 13/798 463/29 |
| 2013/0086484 A1 | 4/2013 | Antin et al. | |
| 2013/0165234 A1 | 6/2013 | Hall et al. | |
| 2013/0190094 A1* | 7/2013 | Ronen | A63F 13/79 463/42 |
| 2013/0212342 A1 | 8/2013 | McCullough et al. | |
| 2013/0244785 A1 | 9/2013 | Gary | |
| 2013/0260896 A1* | 10/2013 | Miura | A63F 13/47 463/42 |
| 2014/0080601 A1* | 3/2014 | Knutsson | A63F 13/35 463/31 |
| 2014/0129322 A1 | 5/2014 | George et al. | |
| 2014/0179426 A1* | 6/2014 | Perry | A63F 13/79 463/31 |
| 2014/0179427 A1* | 6/2014 | Miura | A63F 13/69 463/31 |
| 2014/0179439 A1* | 6/2014 | Miura | A63F 13/53 463/42 |
| 2014/0179440 A1 | 6/2014 | Perry | |
| 2014/0199045 A1 | 7/2014 | Lee et al. | |
| 2014/0204014 A1 | 7/2014 | Thorn et al. | |
| 2014/0206456 A1 | 7/2014 | Koplar | |
| 2014/0228112 A1 | 8/2014 | Laakkonen et al. | |
| 2014/0235338 A1* | 8/2014 | Hansson | A63F 13/533 463/31 |
| 2014/0243097 A1 | 8/2014 | Yong et al. | |
| 2014/0243098 A1 | 8/2014 | Yong et al. | |
| 2014/0274297 A1 | 9/2014 | Lewis et al. | |
| 2014/0364210 A1* | 12/2014 | Murray | G07F 17/3272 463/31 |
| 2015/0026728 A1 | 1/2015 | Carter et al. | |
| 2015/0081777 A1 | 3/2015 | Laine et al. | |
| 2015/0094139 A1 | 4/2015 | Kargar | |
| 2015/0099249 A1* | 4/2015 | Norman | G09B 5/02 434/362 |
| 2015/0142799 A1 | 5/2015 | Eronen et al. | |
| 2015/0224396 A1 | 8/2015 | Okada | |
| 2015/0245084 A1 | 8/2015 | Downing et al. | |
| 2015/0296250 A1 | 10/2015 | Casper | |
| 2015/0306499 A1 | 10/2015 | Chimes et al. | |
| 2015/0331856 A1 | 11/2015 | Choi et al. | |
| 2015/0381689 A1 | 12/2015 | Ganesh et al. | |
| 2016/0005326 A1 | 1/2016 | Syrmis et al. | |
| 2016/0029153 A1 | 1/2016 | Linn et al. | |
| 2016/0078471 A1 | 3/2016 | Hamedi | |
| 2016/0147890 A1 | 5/2016 | Wissner et al. | |
| 2016/0149956 A1 | 5/2016 | Birnbaum et al. | |
| 2016/0277349 A1 | 9/2016 | Bhatt et al. | |
| 2016/0287997 A1 | 10/2016 | Laakkonen et al. | |
| 2016/0350813 A1 | 12/2016 | Balasubramanian et al. | |
| 2016/0366483 A1 | 12/2016 | Joyce et al. | |
| 2017/0001111 A1 | 1/2017 | Willette et al. | |
| 2017/0001122 A1* | 1/2017 | Leung | A63F 13/355 |
| 2017/0050111 A1 | 2/2017 | Perry et al. | |
| 2017/0087460 A1 | 3/2017 | Perry | |
| 2017/0126757 A1 | 5/2017 | Kuo et al. | |
| 2017/0157512 A1 | 6/2017 | Long et al. | |
| 2017/0188116 A1 | 6/2017 | Major et al. | |
| 2017/0189815 A1 | 7/2017 | Tweedale et al. | |
| 2017/0246544 A1* | 8/2017 | Agarwal | A63F 13/63 |
| 2017/0301041 A1 | 10/2017 | Schneider | |
| 2017/0339093 A1 | 11/2017 | Pesavento et al. | |
| 2017/0354888 A1 | 12/2017 | Benedetto et al. | |
| 2018/0001194 A1 | 1/2018 | Sherwani et al. | |
| 2018/0001216 A1 | 1/2018 | Bruzzo et al. | |
| 2018/0014077 A1 | 1/2018 | Hou et al. | |
| 2018/0021684 A1 | 1/2018 | Benedetto | |
| 2018/0033250 A1 | 2/2018 | O'Heeron et al. | |
| 2018/0101614 A1 | 4/2018 | Kuipers et al. | |
| 2018/0126279 A1 | 5/2018 | Stelovsky et al. | |
| 2018/0192142 A1 | 7/2018 | Paul | |

(56) References Cited

U.S. PATENT DOCUMENTS

| | | |
|---|---|---|
| 2018/0295175 A1 | 10/2018 | Smith et al. |
| 2018/0302761 A1 | 10/2018 | Rizzolo et al. |
| 2018/0318708 A1 | 11/2018 | Rom et al. |
| 2018/0343505 A1 | 11/2018 | Loheide et al. |
| 2018/0359477 A1 | 12/2018 | Yang |
| 2019/0052471 A1 | 2/2019 | Panattoni et al. |
| 2019/0208242 A1 | 7/2019 | Bates et al. |
| 2019/0240572 A1* | 8/2019 | Perry ................ A63F 13/60 |
| 2019/0246149 A1 | 8/2019 | Reza et al. |
| 2019/0270019 A1* | 9/2019 | Miura ............. H04N 21/4781 |
| 2019/0270020 A1* | 9/2019 | Miura ................ A63F 13/35 |
| 2019/0282906 A1 | 9/2019 | Yong |
| 2019/0291011 A1* | 9/2019 | Benedetto ........... A63F 13/87 |
| 2019/0297376 A1 | 9/2019 | McCarty et al. |
| 2020/0061465 A1 | 2/2020 | Benedetto et al. |
| 2020/0101382 A1 | 4/2020 | Wheeler et al. |
| 2020/0111306 A1* | 4/2020 | Oberberger ........ G07F 17/3244 |
| 2020/0114267 A1 | 4/2020 | Sakurai |
| 2020/0122031 A1* | 4/2020 | Sherwani ............ A63F 13/79 |
| 2020/0147489 A1 | 5/2020 | Mahlmeister et al. |
| 2020/0169793 A1 | 5/2020 | Akerfeldt |
| 2020/0184041 A1 | 6/2020 | Andon et al. |
| 2020/0188781 A1 | 6/2020 | Stephens |
| 2020/0188792 A1 | 6/2020 | Stephens |
| 2020/0188794 A1 | 6/2020 | Stephens |
| 2020/0188796 A1 | 6/2020 | Stephens |
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |
| 2021/0077907 A1 | 3/2021 | Stephens |
| 2021/0129023 A1* | 5/2021 | Jarzebinski ............ A63F 13/48 |
| 2021/0370169 A1 | 12/2021 | Clingman |
| 2021/0370185 A1 | 12/2021 | Clingman |
| 2021/0374180 A1 | 12/2021 | Clingman |
| 2022/0088474 A1* | 3/2022 | Dicken .................. A63F 13/67 |
| 2022/0167022 A1* | 5/2022 | Bettner ................ H04L 65/613 |
| 2022/0193546 A1 | 6/2022 | Jarzebinski |
| 2022/0401845 A1 | 12/2022 | Clingman |

FOREIGN PATENT DOCUMENTS

| | | |
|---|---|---|
| CN | 113727764 | 11/2021 |
| CN | 113727765 | 11/2021 |
| CN | 114599432 | 6/2022 |
| CN | 116457066 A | 7/2023 |
| EP | 2014342 A1 | 1/2009 |
| EP | 3894030 | 10/2021 |
| EP | 3894031 | 10/2021 |
| EP | 3894032 | 10/2021 |
| EP | 4240505 A | 9/2023 |
| JP | H11179050 A | 7/1999 |
| JP | 2009522853 A | 6/2009 |
| JP | 2011217803 A | 11/2011 |
| JP | 2012-065831 | 4/2012 |
| JP | 2017-182603 | 10/2017 |
| JP | 2022-512425 | 2/2022 |
| JP | 2022-512492 | 2/2022 |
| JP | 2022-513485 | 2/2022 |
| JP | 2022-513849 | 2/2022 |
| JP | 2023-500868 | 1/2023 |
| JP | 7487201 | 5/2024 |
| KR | 2018-0094833 | 8/2018 |
| WO | WO 2009/094611 | 7/2009 |
| WO | WO 2014/047490 | 3/2014 |
| WO | 2015200737 A1 | 12/2015 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |
| WO | WO 2021/242476 | 12/2021 |
| WO | WO 2021/242477 | 12/2021 |
| WO | WO 2021/242478 | 12/2021 |
| WO | WO 2022/098707 | 5/2022 |

OTHER PUBLICATIONS

PCT Application No. PCT/US2019/062602 International Search Report and Written Opinion dated Feb. 14, 2020.
PCT Application No. PCT/US2019/062602 International Preliminary Report on Patentability dated Jun. 8, 2021.
PCT Application No. PCT/US2019/062606 International Search Report and Written Opinion dated Jan. 30, 2020.
PCT Application No. PCT/US2019/062606 International Preliminary Report on Patentability dated Jun. 8, 2021.
PCT Application No. PCT/US2019/062613 International Search Report and Written Opinion dated Feb. 3, 2020.
PCT Application No. PCT/US2019/062613 International Preliminary Report on Patentability dated Jun. 8, 2021.
PCT Application No. PCT/US2019/062626 International Search Report and Written Opinion dated Jan. 29, 2020.
PCT Application No. PCT/US2019/062626 International Preliminary Report on Patentability dated Jun. 8, 2021.
PCT Application No. PCT/US2020/054603 International Search Report and Written Opinion dated Jan. 28, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
PCT Application No. PCT/US2021/057832 International Search Report and Written Opinion dated Feb. 16, 2022.
U.S. Appl. No. 16/220,397 Office Action mailed Sep. 25, 2020.
U.S. Appl. No. 16/359,160 Office Action mailed Jul. 12, 2021.
U.S. Appl. No. 16/359,160 Final Office Action mailed Mar. 12, 2021.
U.S. Appl. No. 16/359,160 Office Action mailed Nov. 13, 2020.
U.S. Appl. No. 16/220,443 Office Action mailed Aug. 6, 2021.
U.S. Appl. No. 16/220,443 Final Office Action mailed Apr. 13, 2021.
U.S. Appl. No. 16/220,443 Office Action mailed Oct. 19, 2020.
U.S. Appl. No. 16/379,683 Final Office Action mailed May 7, 2021.
U.S. Appl. No. 16/379,683 Office Action mailed Nov. 6, 2020.
U.S. Appl. No. 16/220,460 Office Action mailed Jan. 28, 2020.
U.S. Appl. No. 16/380,760 Office Action mailed Mar. 6, 2020.
U.S. Appl. No. 16/220,465 Office Action mailed Jul. 26, 2021.
U.S. Appl. No. 16/220,465 Final Office Action mailed Dec. 24, 2020.
U.S. Appl. No. 16/220,465 Office Action mailed Jun. 15, 2020.
U.S. Appl. No. 16/358,546 Final Office Action mailed Nov. 1, 2021.
U.S. Appl. No. 16/358,546 Office Action mailed Jun. 23, 2021.
U.S. Appl. No. 16/358,546 Final Office Action mailed Jan. 27, 2021.
U.S. Appl. No. 16/358,546 Office Action mailed May 20, 2020.
U.S. Appl. No. 16/679,795 Office Action mailed May 10, 2021.
U.S. Appl. No. 16/885,635 Office Action mailed Mar. 30, 2022.
EP Application No. 19896349.8 Extended European search report dated Jul. 5, 2022.
PCT Application No. PCT/US2020/054603 International Preliminary Report on Patentability dated May 2, 2022.
U.S. Appl. No. 17/566,964, Alexander Jarzebinski, Content Streaming With Gameplay Launch, filed Dec. 31, 2021.
PCT/US21/57832, Replayable Activities for Interactive Content Titles, Nov. 3, 2021.
PCT Application No. PCT/US2021/030378 International Preliminary Report on Patentability dated Nov. 17, 2022.
PCT Application No. PCT/US2021/030379 International Preliminary Report on Patentability dated Nov. 17, 2022.
PCT Application No. PCT/US2021/030380 International Preliminary Report on Patentability dated Nov. 17, 2022.
U.S. Appl. No. 16/358,546 Final Office Action mailed Dec. 30, 2022.
U.S. Appl. No. 17/566,964 Office Action mailed Nov. 23, 2022.

(56) References Cited

OTHER PUBLICATIONS

Application No. 19896543.6 Extended European search report dated Aug. 12, 2022.
Application No. 19895486.9Extended European search report dated Oct. 5, 2022.
Application No. 19897134.3 Extended European search report dated Oct. 5, 2022.
U.S. Appl. No. 17/893,902, Dustin S. Clingman, Media-Object Binding for Dynamic Generation and Displaying of Play Data Associated with Media, filed Aug. 23, 2022.
Anonymous: "New Replay and Resume Features Coming in Heart of the Swarm—StarCraft II—Blizzard News", Jan. 24, 2013 (Jan. 24, 2013), XP093053633, Retrieved from the Internet: URL:https://news.blizzard.com/en-gb/starcraft2/10054757/new-replay-and-resume-features-coming-in-heart-of-the-swarm [retrieved on Jun. 12, 2023] * pp. 3,5.

Chinese Application No. 201980089787.4 First Office Action dated Aug. 18, 2023.
Japanese Application No. 2021-533796 Non Final Notification of Reasons for Refusal date Nov. 2, 2023.
Japanese Application No. 2021-533797 Non Final Notification of Reasons for Refusal dated Oct. 17, 2023.
European Application No. 20882882.2 Extended European Search Report dated Oct. 13, 2023.
U.S. Appl. No. 16/358,546 Notice of Allowance mailed Sep. 26, 2023.
U.S. Appl. No. 18/114,482 Office Action mailed Mar. 28, 2024.
JP Application No. 2021-533794 Decision of Refusal dated May 14, 2024.
CN Application No. 201980089787.4 Second Office Action dated Mar. 29, 2024.
JP Application No. 2022-525694 Non-Final Notification of Reasons for Refusal dated Jun. 4, 2024.

\* cited by examiner

REPLAYABLE ACTIVITIES FOR INTERACTIVE CONTENT TITLES

CROSS-REFERENCE TO RELATED APPLICATIONS

This application claims the benefit of U.S. provisional application No. 63/111,528, filed on Nov. 9, 2020, which is expressly incorporated by reference herein in its entirety.

BACKGROUND

Technical Field

The present technology pertains to replayable activities for interactive content titles. More specifically, the present technology may create, generate, and/or provide various ways for administering operation of replayable activities for interactive content titles.

Background

Replaying particular activities in platform-based gameplay (e.g., Sony PlayStation®) as a form of competitive gaming has been an increasingly popular form of gameplay for game players. For example, speedrunning has become a competitive gaming phenomenon where game players replay certain activities in various interactive content titles to attain a top score in terms of speed, score, or distance.

Presently available gaming media or platforms do not provide an in-game or in-platform feature that provide ways for game players to log and compare their scores for certain activities within games. Typically, game players participate in such challenges and determine their scores for challenging these activities outside the scope of provided features in the gaming media or platforms.

There is, therefore, a need in the art for systems and methods for creating, generating, and/or provide various ways for administering operation of replayable activities for interactive content titles.

SUMMARY

Aspects of the present disclosure include systems and methods for creating and/or administering operation of replayable activities for interactive content titles is provided. The replayable activities may be competitive in nature and may be used to determine a ranking. A first set of data associated with an interactive content title may be received. The first set of data associated with the interactive content title may be received from an interactive content source server. The interactive content title may be is at least partially hosted at the interactive content source server. The first set of data may be associated with a replayable activity for the interactive content title. A score may be determined based on the first set of data for an associated user account. The associated user account may be placed in the ranking based on scores of other user accounts and respective sets of data associated with the replayable activity for the interactive content title.

The associated user account may be triggered to play the replayable activity once the associated user account has reached a checkpoint in the interactive content title. The ranking associated with the replayable activity may also be generated. The ranking may be a global ranking or a local ranking between friends of the associated user account. The replayable activity may be replayable for a set period of time, and at an end of the set period of time, the ranking may be finalized and rewards may be allocated based on the ranking. A replayable activities menu may be generated for displaying a set of replayable activities available to the associated user account from the interactive content title and at least another interactive content title.

An invitation or notification may be sent to the associated user account to play the replayable activity, where the invitation may be initiated by another user account. The invitation or notification may be sent automatically when another user account beats the user account in the ranking, which alerts to the user account that there has been change in the ranking. A combined gameplay view may be generated to include a first gameplay view associated with the associated user account and a second gameplay view associated with another use account, wherein the combined gameplay view is a playback or displayed synchronously in real-time. An overlay may be generated during gameplay of the replayable activity for the associated user account, wherein the overlay displays completion information regarding the replayable activity.

In addition, one or more first object files may be associated with the replayable activity. The one or more first object files may comprise object data collected by the interactive content source server. One or more second object files may be recorded through the object recorder. The one or more second object files may comprise associated object data collected by the interactive content source server. One or more replayable activities specific to the interactive content title may be generated, where the one or more second object files may be used for determining scores for the one or more replayable activities. Options may be provided to the interactive content source server to add other replayable activities and associated rewards specific to the interactive content title.

An option may be provided, via a graphical user interface associated with the associated user account, for the associated user account to add other replayable activities and associated rewards specific to the interactive content title. A playback of gameplay by the associated user account may be generated, where the playback may display data regarding controller inputs synchronous to the gameplay upon completion of the gameplay of the replayable activity.

Various aspects of the present disclosure may include methods for creating and/or administering operation of replayable activities for interactive content titles. Such methods may include receiving, from an interactive content source server, a first set of data associated with an interactive content title at least partially hosted at the interactive content source server, wherein the first set of data is associated with a replayable activity for the interactive content title. Such methods may include determining a score based on the first set of data for an associated user account. Such methods may include placing the associated user account in a ranking based on scores of other user accounts and respective sets of data associated with the replayable activity for the interactive content title. Such methods may include triggering the associated user account to play the replayable activity once the associated user account has reached a checkpoint in the interactive content title. Such methods may include generating the ranking associated with the replayable activity, wherein the ranking can change between a global ranking and a local ranking between friends of the associated user account. Such methods may include sending an invitation or notification to the associated user account to play the replayable activity, where the invitation or notification may be initiated by another user account. Such methods may include generating an overlay during gameplay of the replayable activity for the associated user account, wherein the overlay displays completion information regarding the replayable activity.

Additional aspects of the present disclosure may include systems for creating and/or administering operation of replayable activities for interactive content titles. Such systems may include one or more processors that executes instructions stored in memory. Execution of the instructions by the one or more processors may receive, from an interactive content source server, a first set of data associated with an interactive content title at least partially hosted at the interactive content source server, wherein the first set of data is associated with a replayable activity for the interactive content title. Execution of the instructions by the one or more processors may determine a score based on the first set of data for an associated user account. Execution of the instructions by the one or more processors may place the associated user account in a ranking based on scores of other user accounts and respective sets of data associated with the replayable activity for the interactive content title.

Further aspects of the present disclosure include non-transitory computer-readable medium or storage media having embodied thereon a program executable by a processor to provide a method for creating and/or administering operation of replayable activities for interactive content titles.

BRIEF DESCRIPTION OF THE DRAWINGS

FIG. 4D illustrates an example graphical user interface of an option to select between viewing a global leaderboard and a friends leaderboard, according to an aspect of the present disclosure;

FIG. 4E illustrates an example graphical user interfaces of a leaderboard showing friends' ranking for a particular replayable activity, according to an aspect of the present disclosure;

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Aspects of the present disclosure include systems and methods for creating and/or administering operation of replayable activities for different interactive content titles is provided. A first set of data associated with an interactive content title may be received. The first set of data associated with the interactive content title may be received from an interactive content source server. The interactive content title may be is at least partially hosted at the interactive content source server. A score may be determined based on the first set of data for an associated user account. The associated user account may be placed in a ranking based on scores of other user accounts and respective sets of data associated with the replayable activity for the interactive content title.

Figure 1:
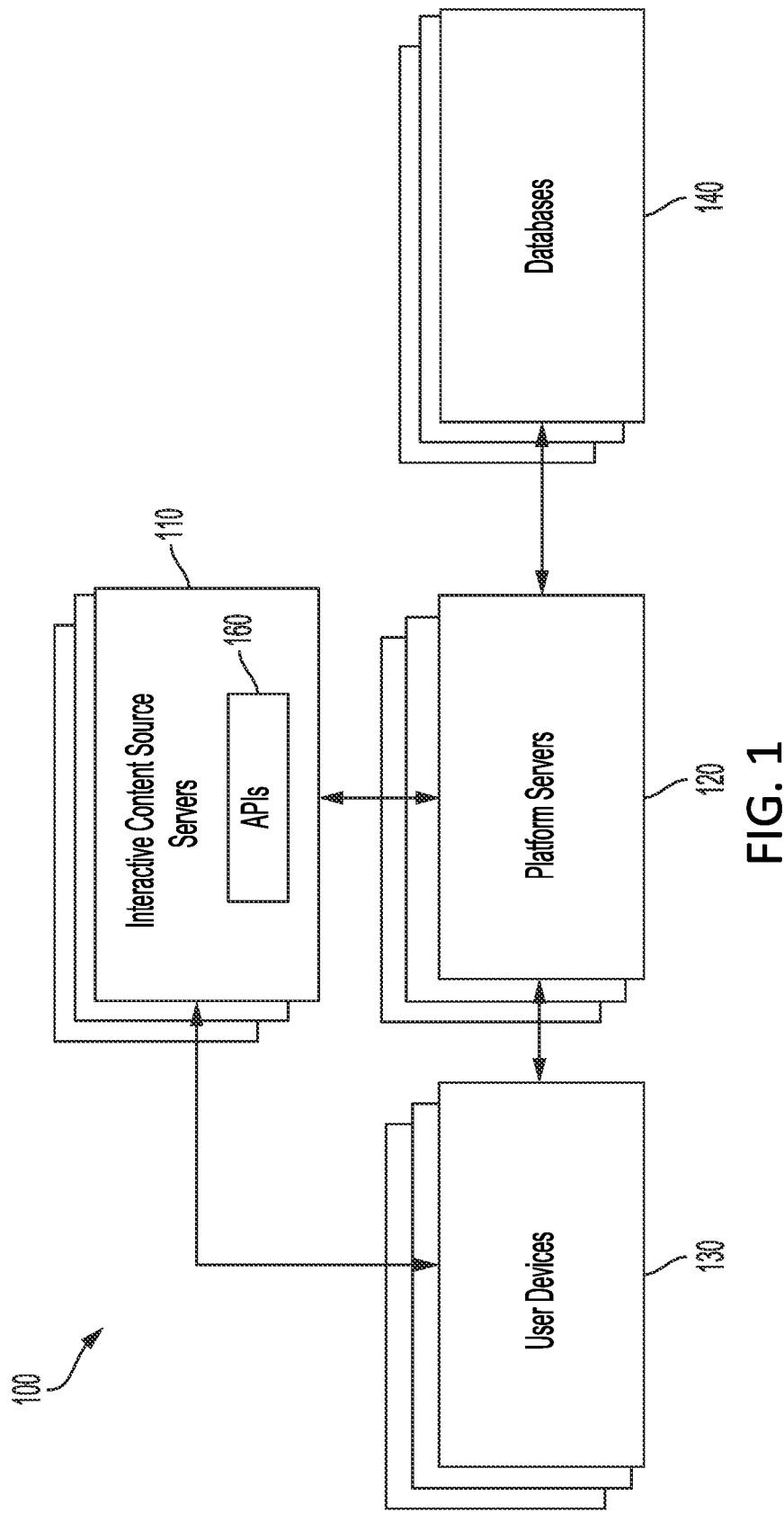
FIG. 1 illustrates an example network environment in which a system for creating and/or administering operation of replayable activities for interactive content titles may be implemented, according to an aspect of the present disclosure.

FIG. 1 illustrates an example network environment 100 in which a system for media-object binding and displaying real-time play data for a streaming or live-streaming media based on one or more objects displaying therein. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 6.

The databases 140 may be stored on the platform server 120, the media streaming servers 110, any of the servers 218 (shown in FIG. 2A), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2A:
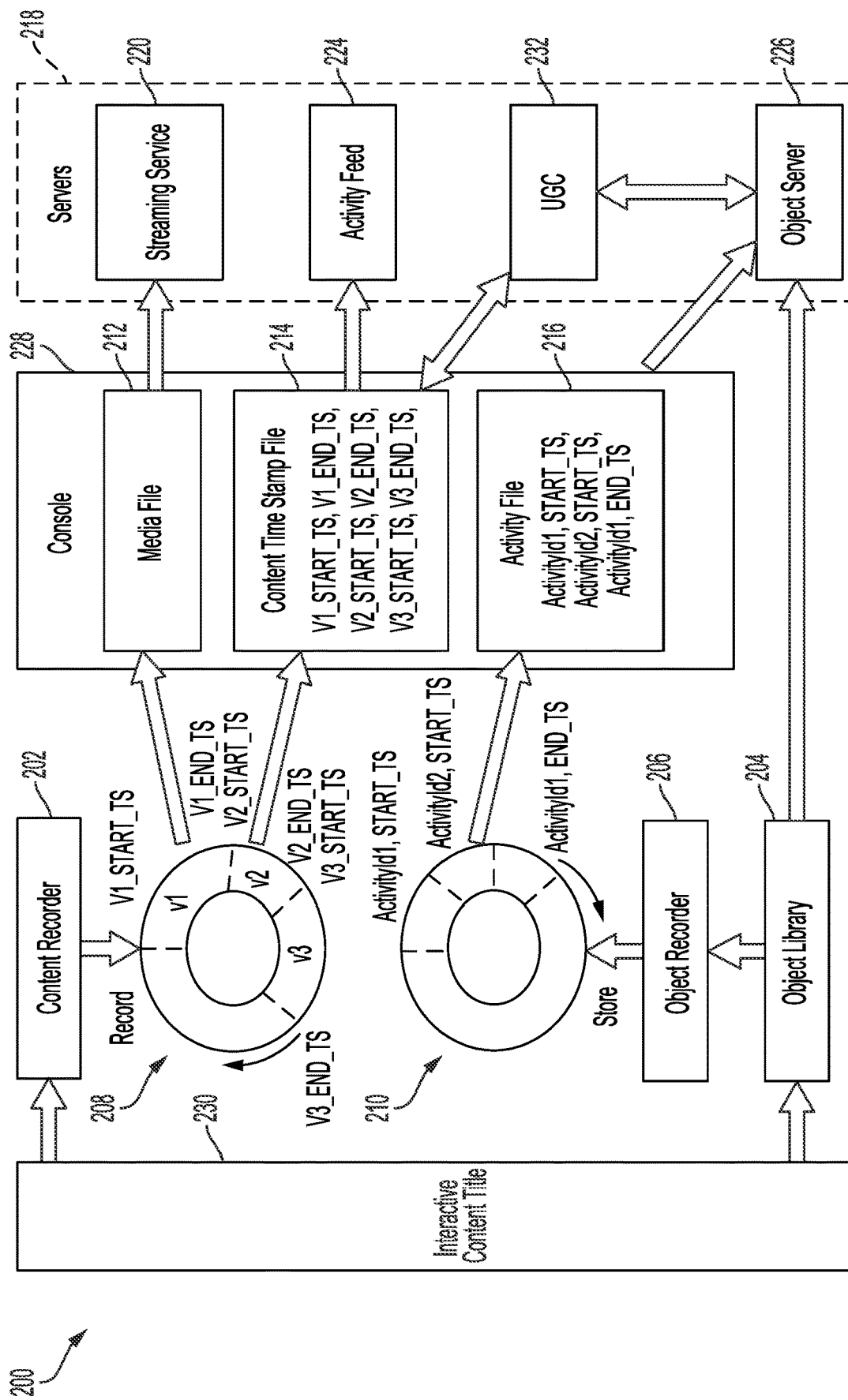
FIG. 2A illustrates a detailed example network in which a system for binding object data from a universal data system to media content may be implemented, according to an aspect of the present disclosure.

In the example network environment 200 of FIG. 2A, an example console 228 (e.g., a user device 130) and example servers 218 (e.g., streaming server 220, activity feed server 224, UGC server 232, and an object server 226) are shown. The console 228 may be implemented on the platform server 120, a cloud server, or on any of the servers 218. The console 228 may further includes a content recorder 202 and an object recorder 210, described in more detail below, where content (e.g., media) may be recorded and outputted through the console 228. The interactive various content titles 230 may be executed on the console 228. Alternatively or in addition to, the content recorder 202 may be implemented on the platform server 120, a cloud server, or on any of the servers 218. Such content recorder 202 may receive and record content (e.g., media) from an interactive content title 230 (e.g., interactive content source servers 110) onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in an object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 226 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 214, 216.

Figure 2B:
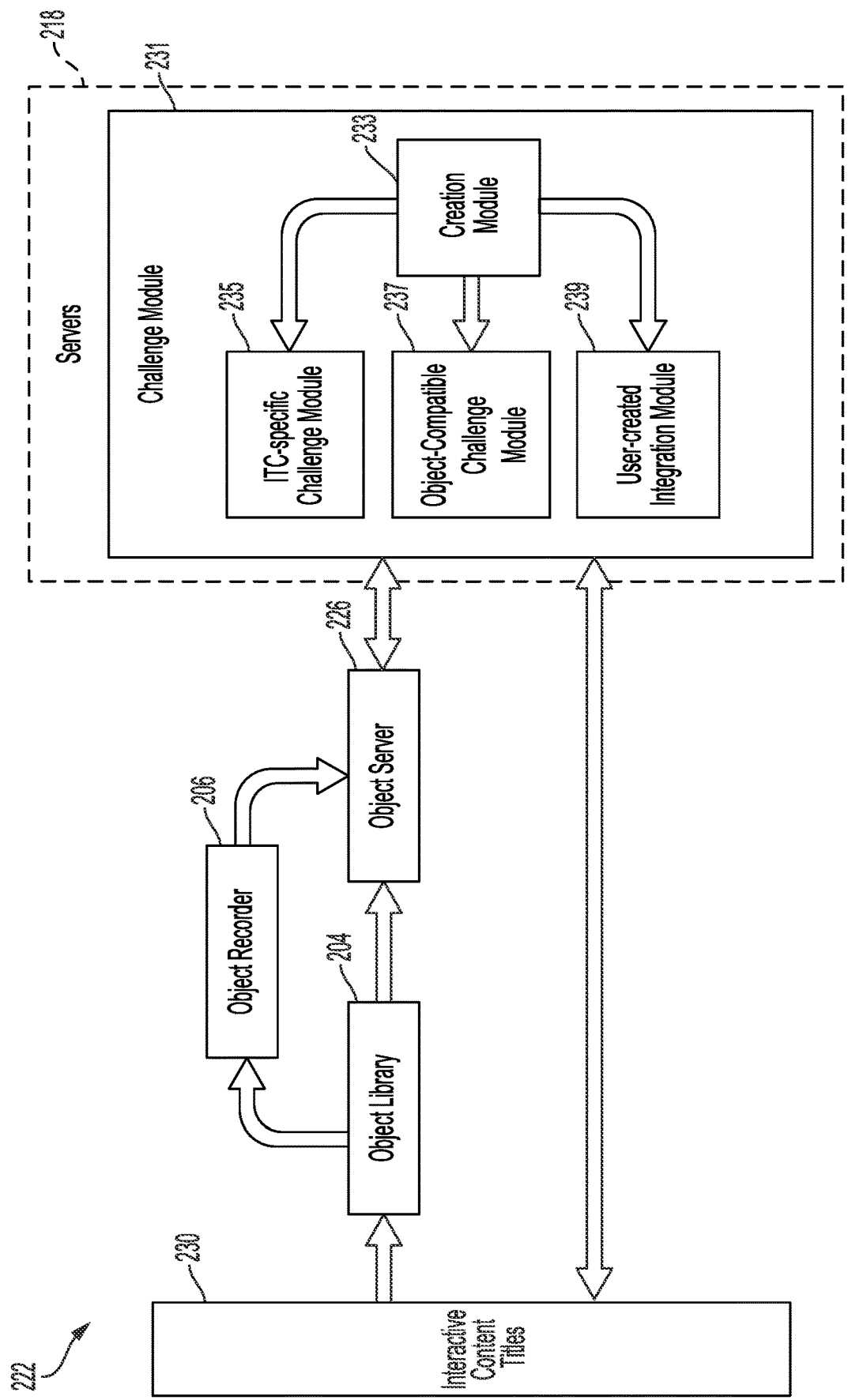
FIG. 2B illustrates a portion of an example network in which the interactive content title sends object data to various modules at one or more servers, according to an aspect of the present disclosure.

FIG. 2B illustrates an example concentrated view 222 of the example network environment 200, where a challenge module 231, which may be implemented on the servers 218 (e.g., the platform server 120, a cloud server, or on any of the servers 218), may receive data related to replayable activities from interactive content titles 230. The challenge module 231 may query and/or receive from the interactive content title 230 for specific activity data associated with creating replayable activities, scoring gameplay of the replayable activities by user accounts, and displaying challenge-related information with respect to the replayable activities. The interactive content titles 230 may also send object data to the object library 204, optionally through the object recorder 206, and stored as object files 216 at the object server 226. The challenge module 231 may query, and/or receive from the object server 226, particular object data regarding a particular user account, a particular interactive content title 230, and particular activity in order to provide challenge-related data for user accounts playing replayable activities.

The challenge module 231 may include a creation module 233, which may alternatively be separate from the challenge module 231. The creation module 233 may create or institute different levels for creating challenges for respective interactive content titles 230. For example, the creation module 233 may institute an ICT-specific challenge module 235. The ICT-specific challenge module 235 may be created for a specific replayable activity for a particular interactive content title 230 and may receive sets of data associated with that replayable activity and the respective interactive content title 230 that it was created for. For example, for the ICT-specific challenge module 235, the challenge module 231 or the ICT-specific challenge module 235 itself, may query for or receive a set of activity data that encompasses all the kinds of activity data that the interactive content title 230 may be categorically extrapolating from gameplay. Then, the creation module 233 may define one or more replayable activities based on the set of activity data provided by the interactive content title 230 and create one or more ICT-specific challenge module s235 that are specific to that interactive content title 230 to monitor the associated activities and determine scores.

The creation module 233 may create an object-compatible challenge module 237 that may use object data from the object server 226 to create suitable replayable activities and also determine scores and rankings for each gameplay of the replayable activities. Furthermore, the object-compatible challenge module 237 may determine and notify the object server 226 to forward certain object files to trigger the object-compatible challenge module 237 to respond accordingly with respect to sending challenge-related information for display at the user device 130 and receiving challenge-related activity data for determining an associated score and ranking for the user account playing the replayable activity. The object-compatible challenge module 237, monitoring the replayable activities, provides a hands-off experience for the interactive content source server 110, given that object data is already automatically sent and generated and eventually sent to the object server 226. The object-compatible challenge module 237 may further query for additional data not collected at the object server 226 with respect to additional ITC-specific challenges that the interactive content title 230 may have created. The creation module 233 may receive indications, from the interactive content titles 230 (e.g., interactive content source servers 110), such as inputs from users (e.g. developers of the interactive content titles) through a provided graphical user interface, of particular sets of activity data to be analyzed and recorded as replayable activities at the challenge module 231. The object-compatible challenge module 237 may provide a more advanced integration of challenges for interactive content titles 230 that seek to enhance the challenge feature for their respective interactive content title 230 by providing additional or different challenges than the ones created by the object-compatible challenge module 237.

The creation module 233 may also institute a user-created integration module 239, optionally for each interactive content title 230, that may query for and/or receive additional data from the interactive content title 230, where the additional data was not collected at the object server 226. The additional data may be related to additional challenges that user accounts may have created that are specific to the interactive content title 230. The creation module 233 may receive, from the user devices 130, such as inputs from a provided graphical user interface, particular sets of activity data to be analyzed and recorded as replayable activities at the challenge module 231.

The ICT-specific challenge module 235, the object-compatible challenge module 237, and the user-created integration module 239 may serve as separate modules or part of one or more shared modules. The received activity data may serve to provide various challenge-related information to be displayed at the user devices 130. FIGS. 4A-4H, which will be described in more detail below, illustrate different example graphical user interfaces 400 (400A, 400B, etc. . . . ) that display one of the various challenge-related information at the user devices 130.

Figure 2C:
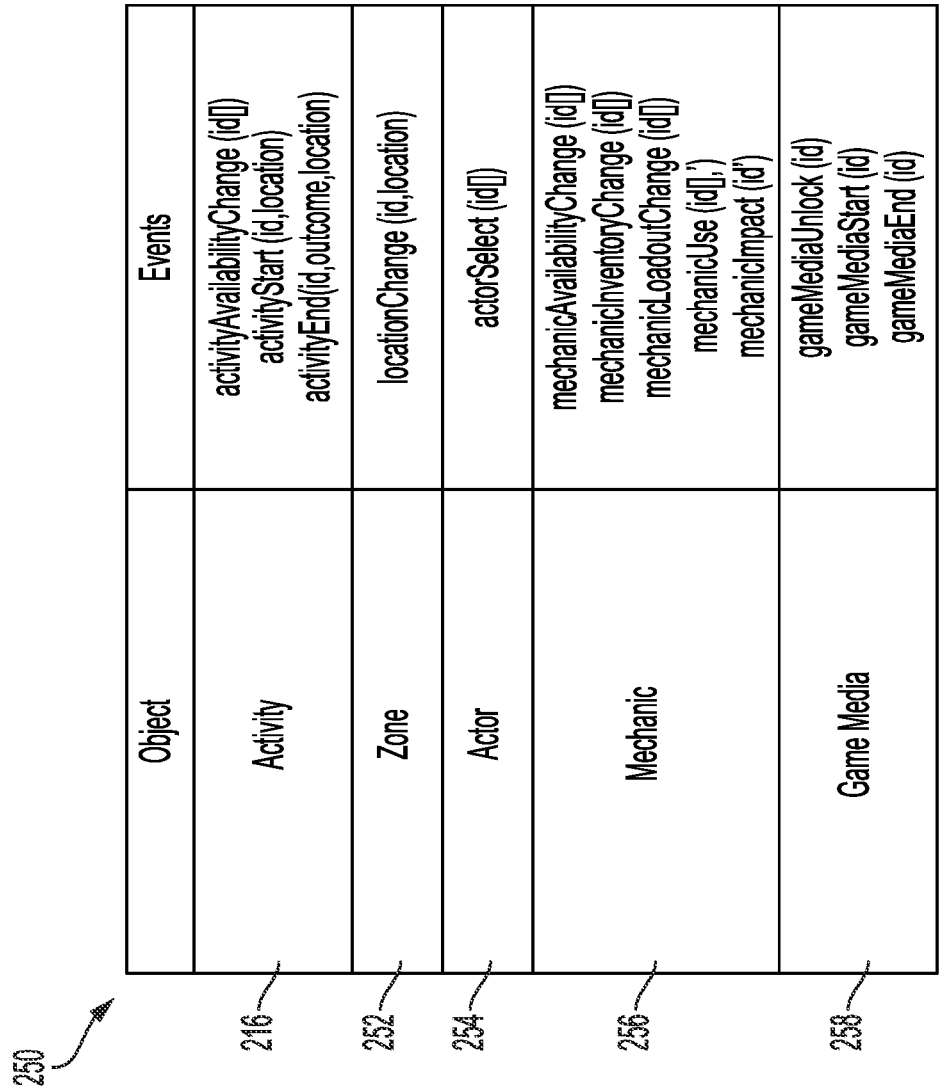
FIG. 2C illustrates an example table of various objects and associated events, according to an aspect of the present disclosure.

As shown in the example table 250 of FIG. 2C, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be zone data files 252, actor data files 254, mechanics data files 256, game media data files 258, and other gameplay-related data files.

Such object data (e.g., the object file 216) may be categorized as in in progress, open-ended, or competitive. Such activity data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g., fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Figure 3:
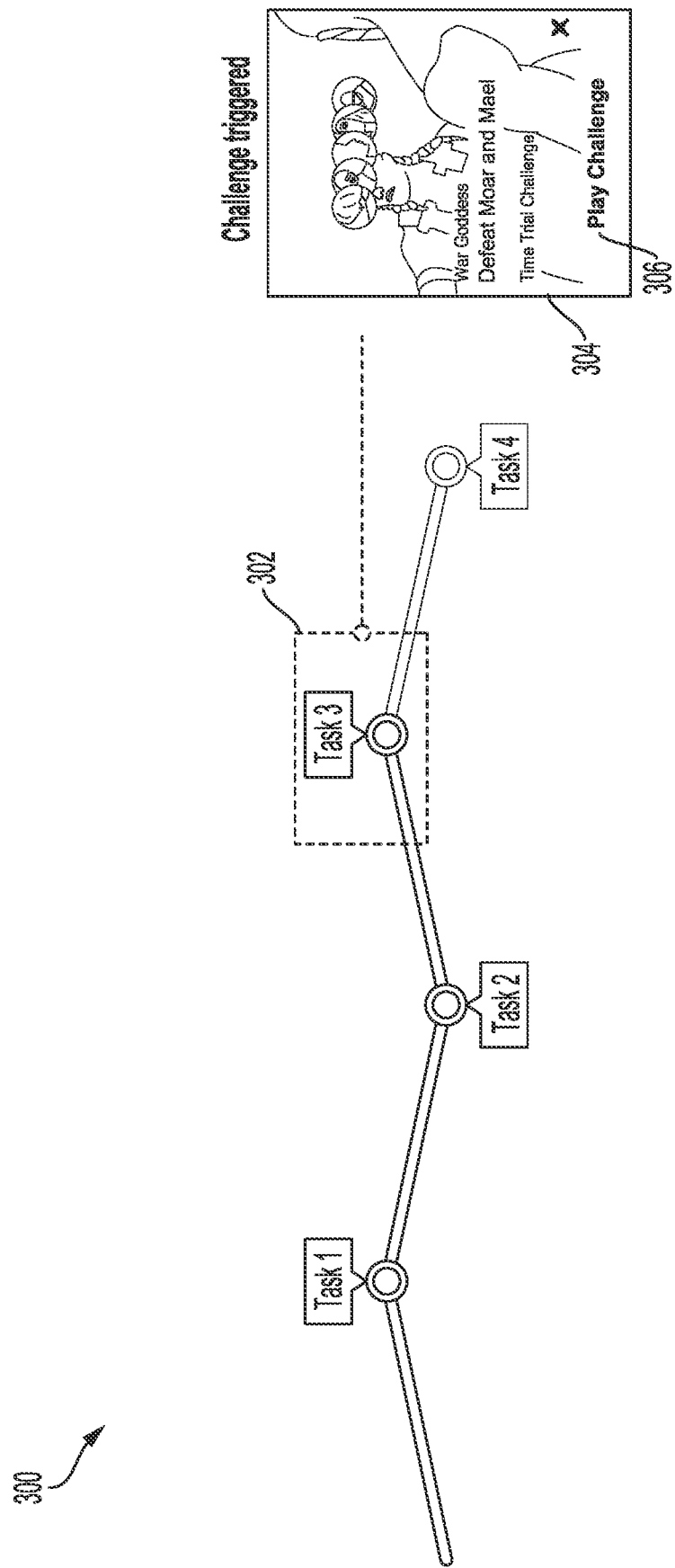
FIG. 3 illustrates an example diagram of a gameplay timeline wherein challenges are triggered by the completion of various tasks, according to an aspect of the present disclosure.

FIG. 3 is a flowchart illustrating an example diagram of a gameplay timeline 300 for an example interactive content title 230, where challenging replayable activities are triggered by a completion of various tasks, according to an aspect of the present disclosure. Replayable activities may be unlocked for challenging once a task, completing the replayable activity, is completed. For example, as shown in FIG. 3, if a replayable activity includes finishing a route and then defeating a boss, a first completion of defeating the boss, Task #3 302, may unlock the replayable activity to be replayed as a challenge. A notification 304 indicating the completion of the task may further include a "Play Challenge" option 306 to invite the player replay the replayable activity.

Figure 4A:
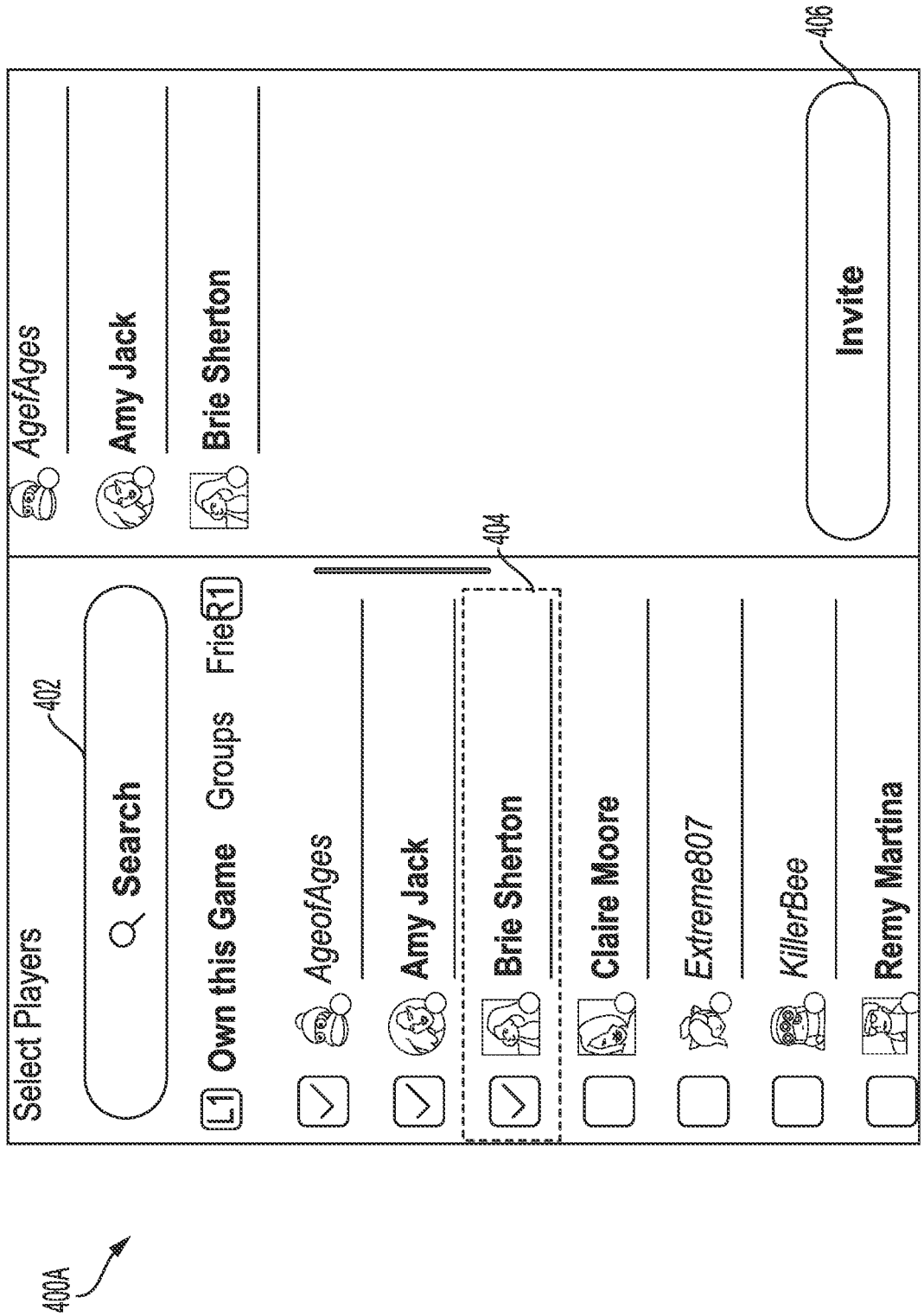
FIGS. 4A and 4B illustrate example graphical user interfaces of a challenge invitation or notification to a replayable activity, according to an aspect of the present disclosure.

Once the replayable activity is unlocked, the player may send and receive challenge invitations (i.e., notifications) with respect to that replayable activity. FIG. 4A illustrates an example graphical user interface 400A that provides a search option 402, selection options 404 of other players (e.g., individual friends that own the game, an exclusive challenge between a group of friends, etc.) to send a challenge invitation to, and an invite button 406. For some challenge invitations, a player may be able to send such a challenge to another user that does not own the interactive content title 230 in the form of a demo-like experience. Although not shown in FIG. 4A, the player may also be able to create their own challenges and send invitations to play such challenges as well.

Figure 4C:
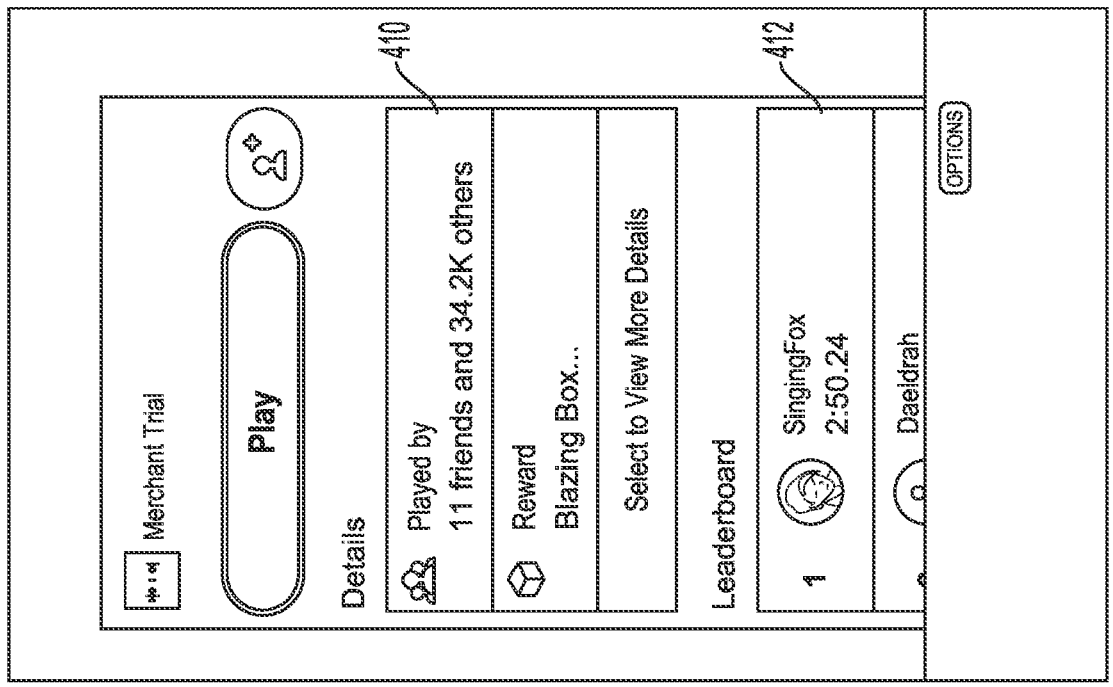
FIG. 4C illustrates an example graphical user interface for selecting user accounts to invite to play a replayable activity, according to an aspect of the present disclosure.
Figure 4B:
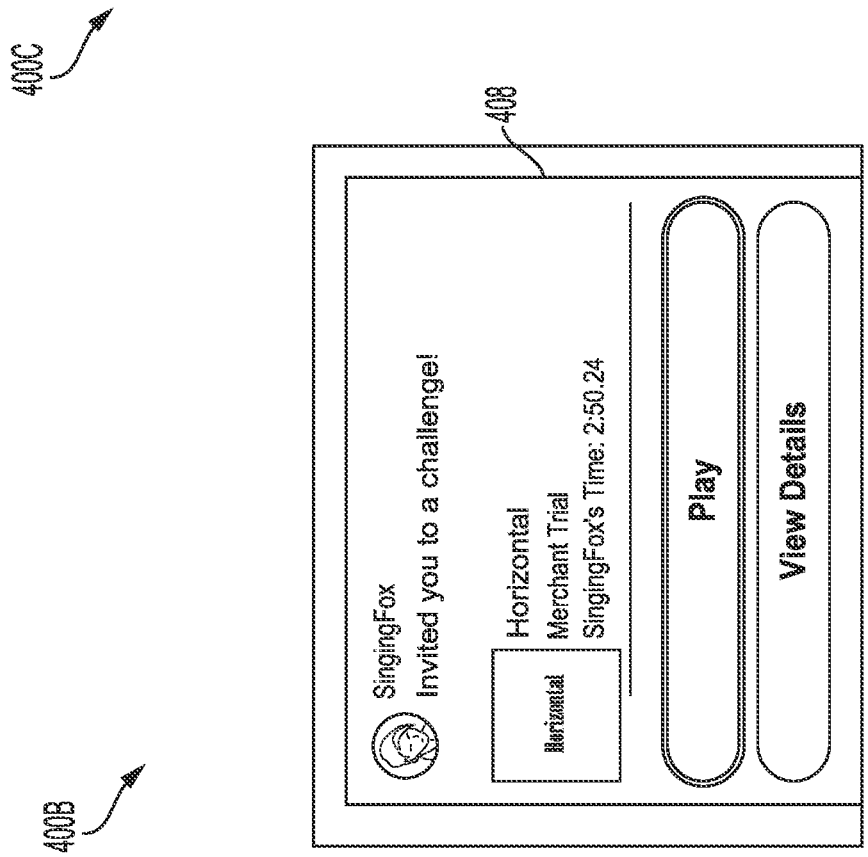
Figures 4D, 4E:
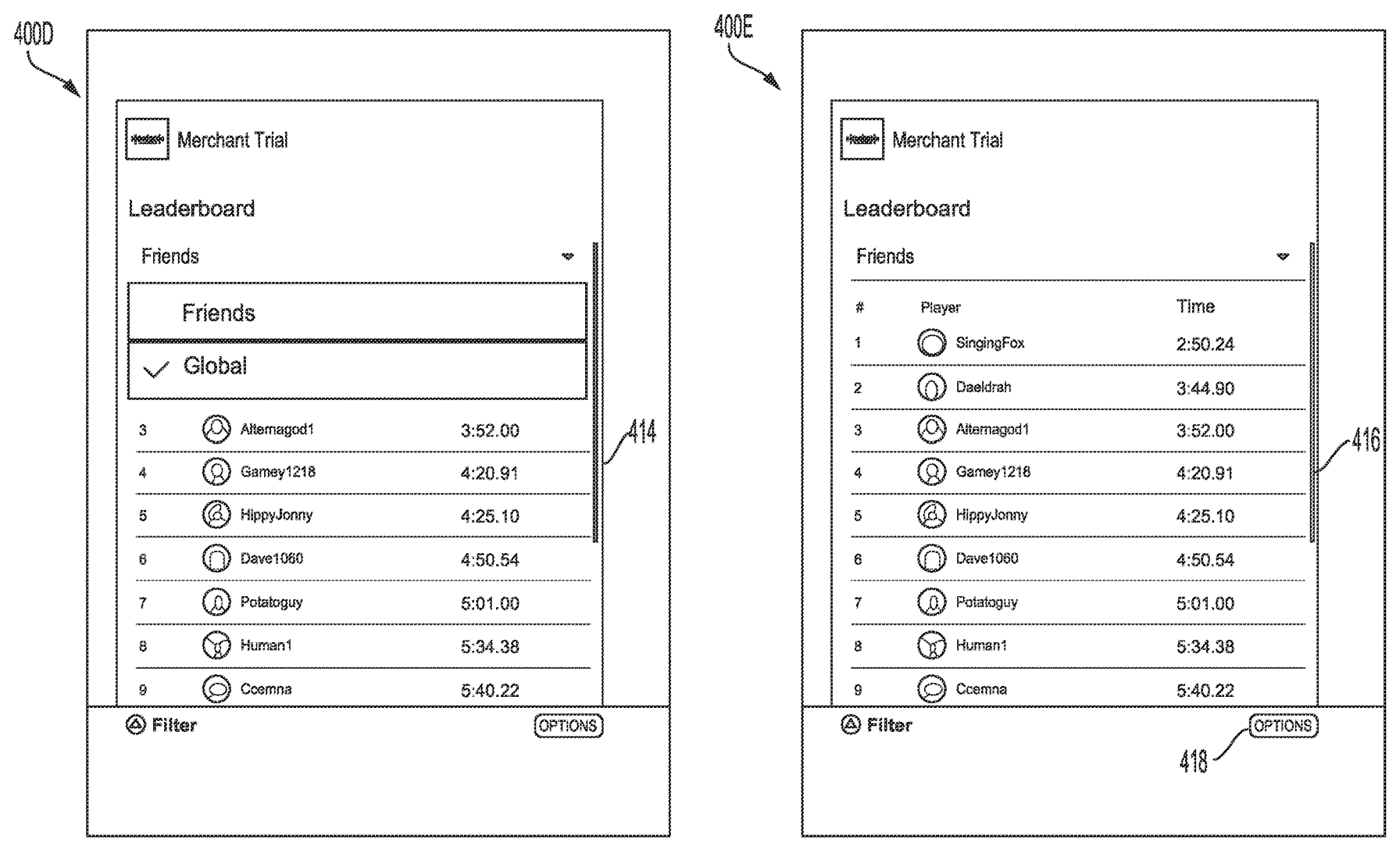

FIGS. 4B and 4C illustrate example graphical user interfaces 400B, 400C of challenge invitations, while the challenge invitation 408 may include more details regarding challenge information 410, such as which other user and friends have challenged this particular replayable activity and the rewards associated with playing and/or completing the replayable activity. The rewards may be provided by the interactive content title 230 and/or at the platform-level. The challenge invitation may further illustrate part of a leaderboard 412 with respect to the replayable activity and the highest scores recorded at the ICT-level and/or the platform-level. FIGS. 4D and 4E further illustrate example graphical user interfaces 400D, 400E for displaying a global leaderboard 414 or a friends' leaderboard 416 for a particular replayable activity. The global leaderboard 414 and friends' leaderboard 416 may provide filtering options 418 wherein a player can view a more insular view of particular players, such as players that have similar abilities or characteristics of interest.

Figure 4F:
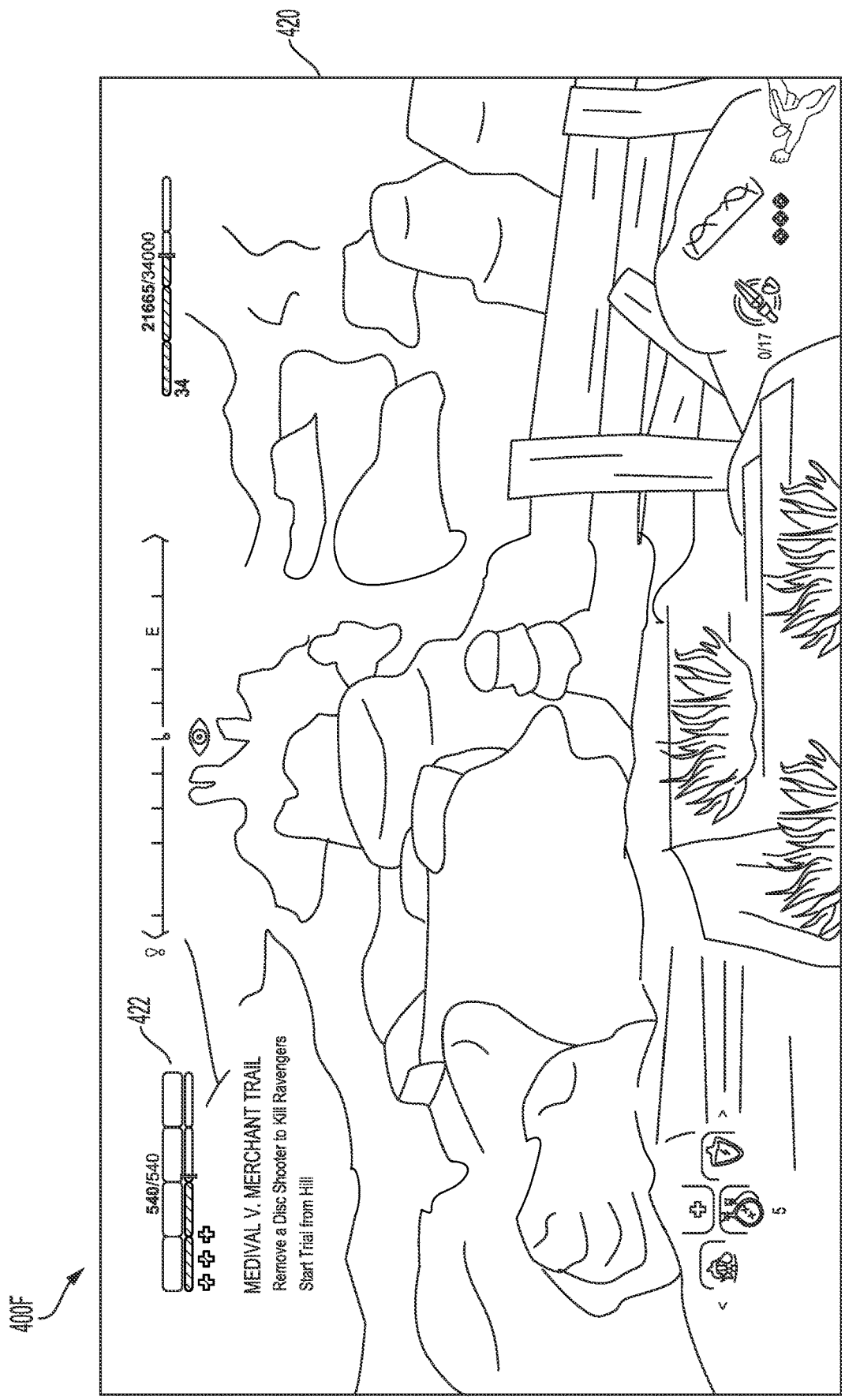
FIG. 4F illustrates example graphical user interface of an in-game graphical overlap that displays repeatable activity data, according to an aspect of the present disclosure.
Figures 4G, 4H:
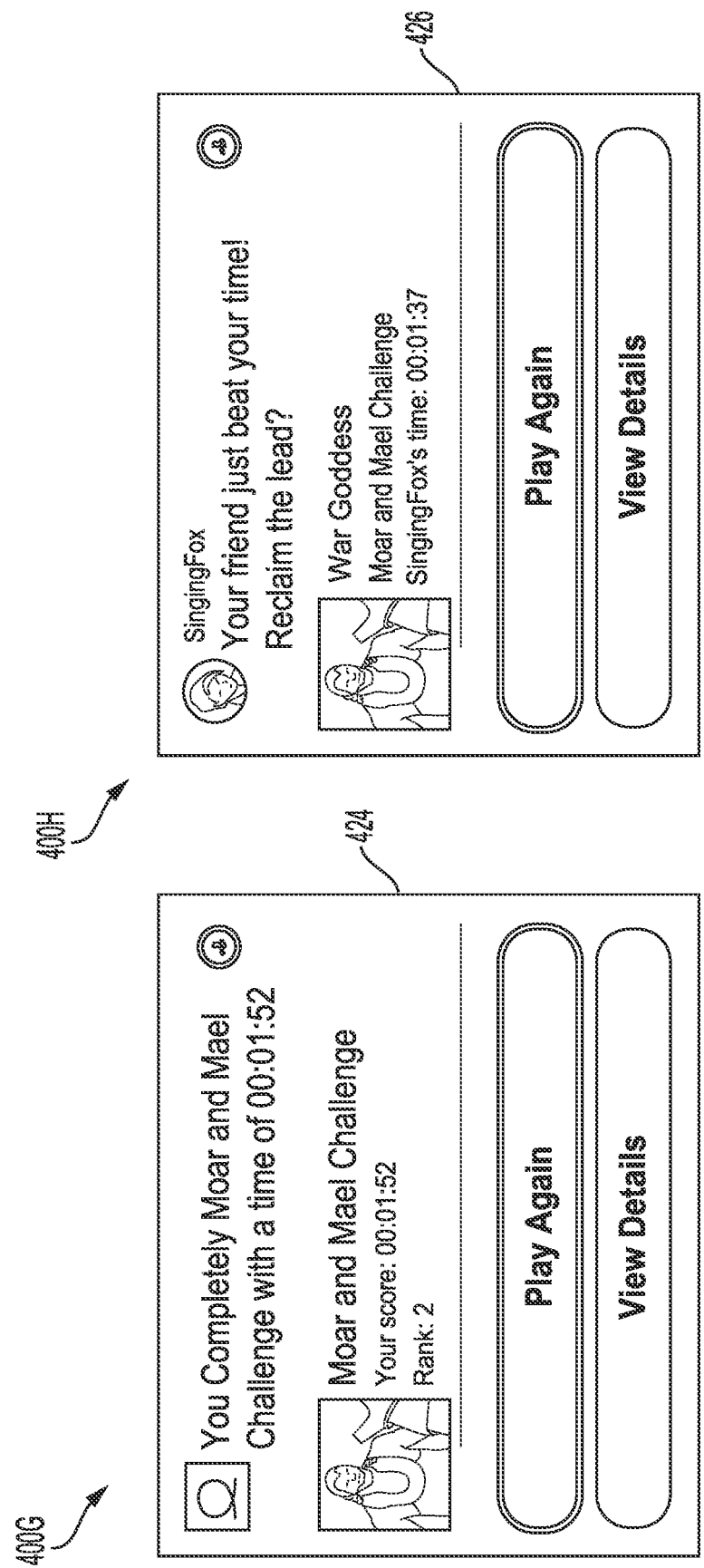
FIG. 4G illustrates an example graphical user interface of a replay notification for a replayable activity indicating the user's score and rank, according to an aspect of the present disclosure.
FIG. 4H illustrates an example graphical user interface of a replay notification for a replayable activity indicating a user's friend has beat the user's score, according to an aspect of the present disclosure.

Once a player has selected to accept the challenge, as shown in the graphical user interface 400F in FIG. 4F, within a gameplay view 420 of the interactive content title 230 may include an in-game graphical overlay 422 that displays data related to the repeatable activity, such as the challenge objectives, percentage of completion, elapsed time, and/or current score. Once the challenge is completed, as shown in graphical user interface 400G of FIG. 4G, a first notification 424 may be presented to the player to replay the replayable activity along with the player's score and ranking. Additionally, as shown in the graphical user interface 400H of FIG. 4F, a second notification 426 may be presented to other players whose scores were beat by the player to re-challenge and reclaim their ranking for the replayable activity. The second notification 426 may be a push notification on the respective client devices' of those players, such as mobile devices or personal computers while those players are not actively on the platform.

Figure 4I:
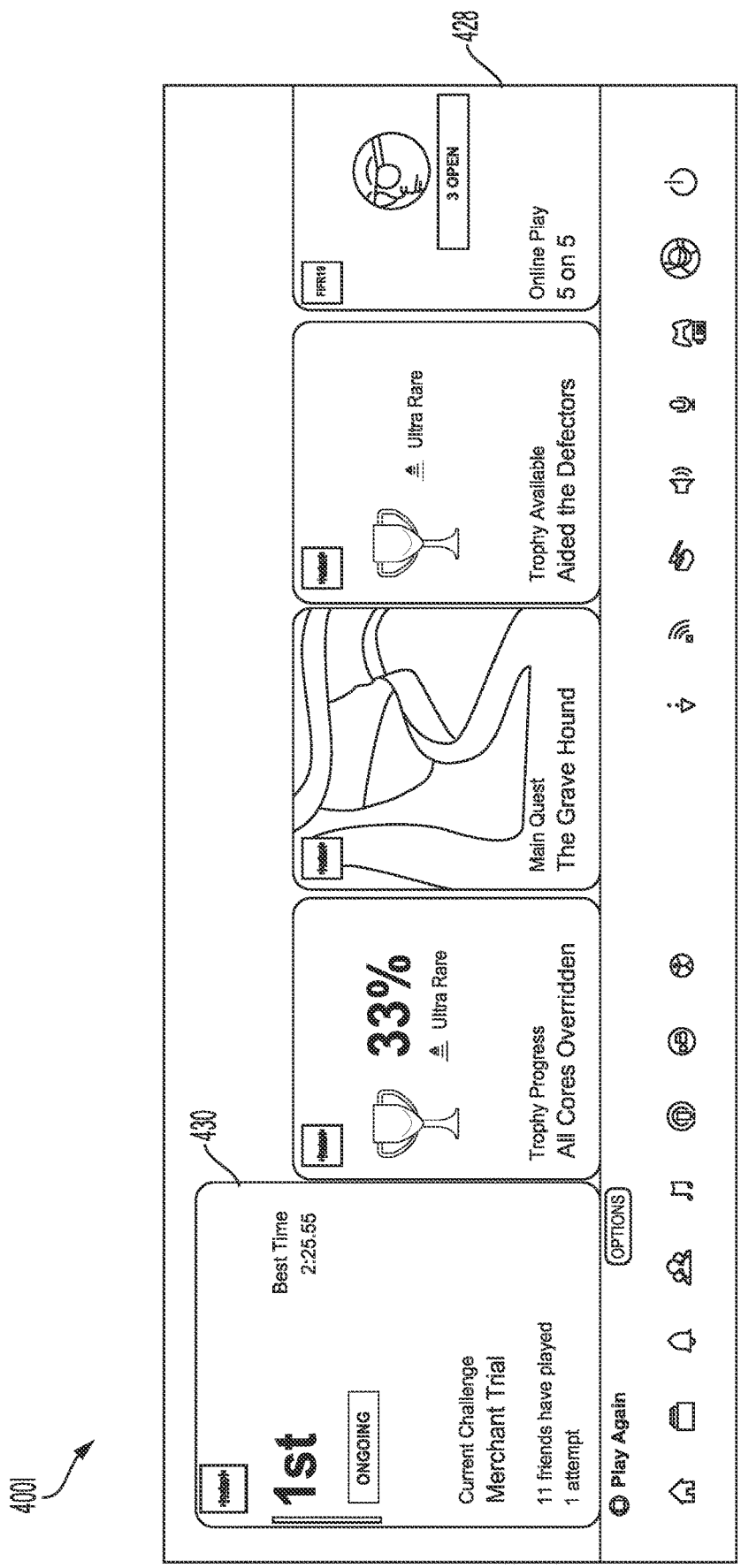
FIG. 4I illustrates an example graphical user interface of a replayable activities menu for displaying a set of replayable activities from one or more interactive content titles, according to an aspect of the present disclosure.
Figure 4J:
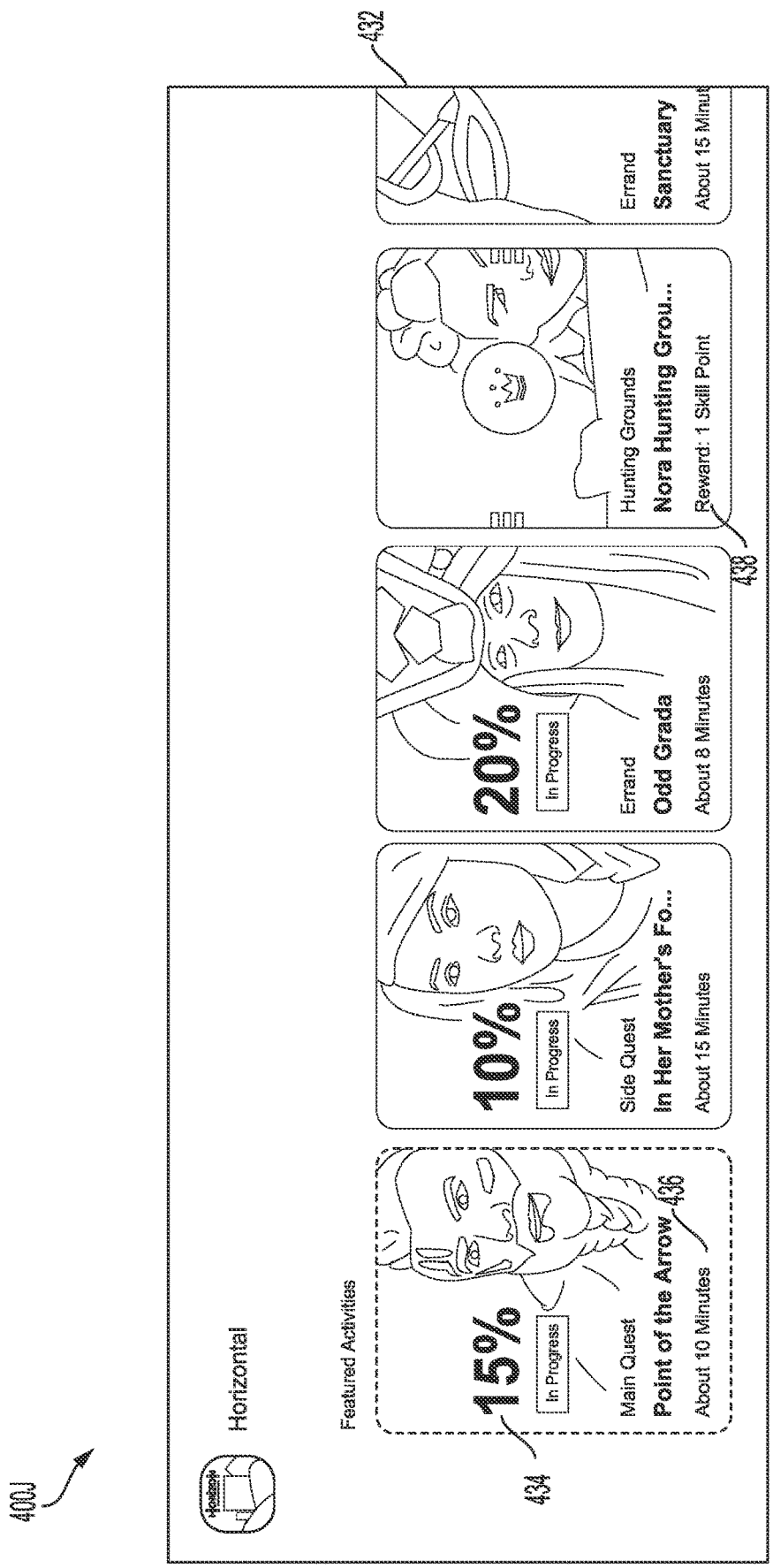
FIG. 4J illustrates an example graphical user interface of another replayable activities menu for displaying a set of replayable activities from one or more interactive content titles, according to an aspect of the present disclosure.

Furthermore, as shown in the graphical user interface 400I of FIG. 4I, a user account menu 428 may include replayable activities information along with other types of summary information regarding one or more interactive content titles 230 associated with the user account. For example, the user account menu 428 may include a "Currently Challenge" indication 430 of a replayable activity the user account is currently playing. In addition, as shown in the graphical user interface 400J of FIG. 4J, a replayable activities menu 432 may include specific information about each replayable activities, including a progress indicator 434, a gameplay length 436, and a reward indicator 438 for each respective replayable activity. All of the information required for display in the graphical user interfaces 400 (400A, 400B, etc. . . . ) described above may be derived through the challenge module 231, which either receives related activity data from the interactive content titles 230 directly, or through the object server 226.

Figure 5:
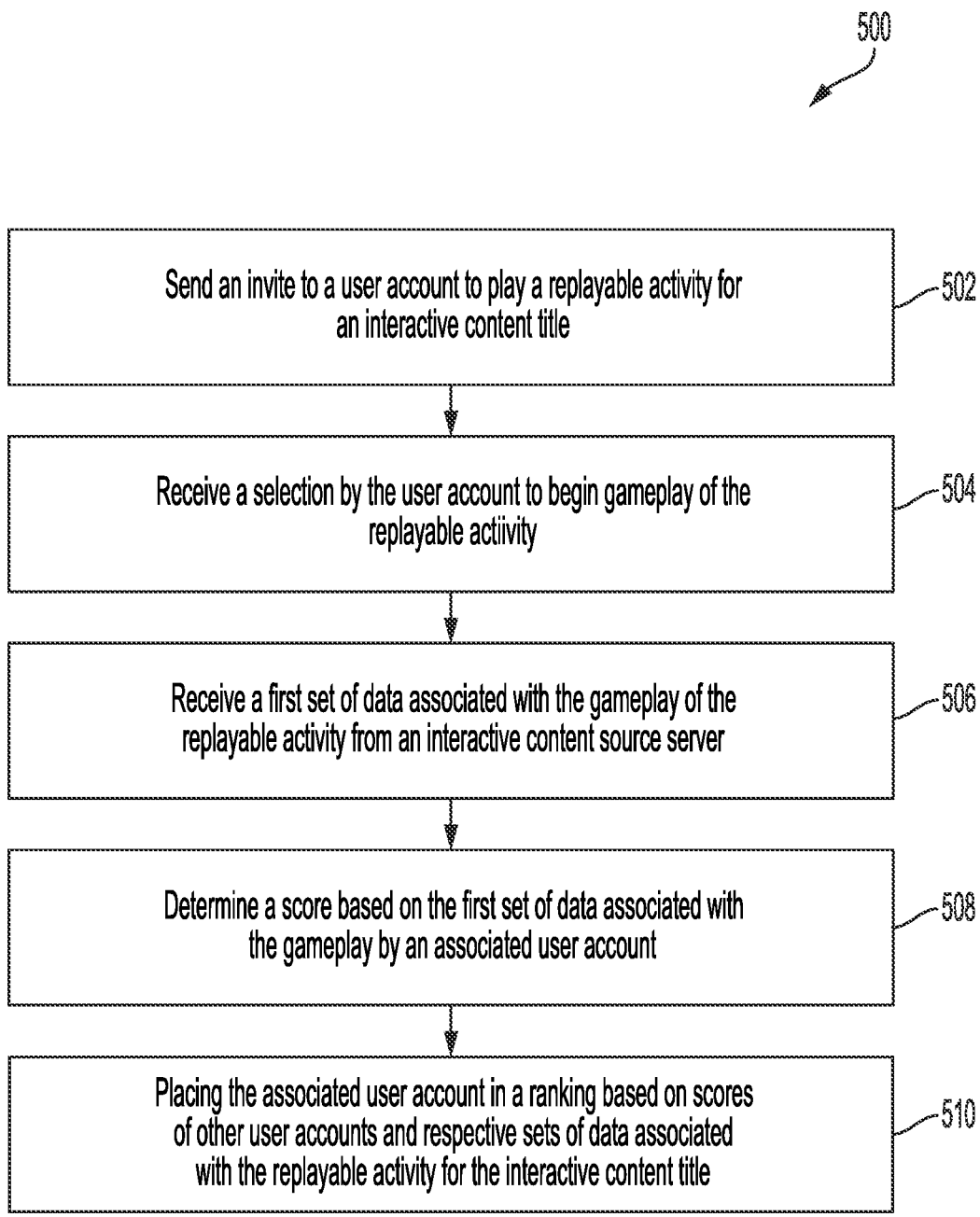
FIG. 5 illustrates a flowchart of an example method for generating a gameplay of a replayable activity, according to an aspect of the present disclosure.

FIG. 5 is a flowchart of an example method 500 for generating a gameplay of a replayable activity, according to an aspect of the present disclosure. An optional invite may be sent (502) to an associated user account to play a replayable activity for an interactive content title 230. The invite may be triggered by the associated user account reaching a checkpoint in the interactive content title 230. Alternatively, the invite may be sent by another user account to play the replayable activity. In some cases, the invitation or notification may be sent automatically when the other user account beats the user account in a ranking with respect to the replayable activity. A selection, by the user account, may be received (504), the selection to begin gameplay of the replayable activity. During gameplay, if the user account is challenging another user account, a combined gameplay view may be generated, including a first gameplay view associated with associated user account, and a second gameplay view associated with the other user account, where in the combined gameplay view may be a playback, or displayed synchronously in real time. In some cases, the user account may see a ghost view of the other user account overlaid in their gameplay view.

In addition, the replayable activity may load same or different loadouts (e.g., characters, weapons, abilities, etc. . . . ) for each user account that plays the replayable activity, depending on the settings of the replayable activity. Some replayable activities may require all gameplay to start with the same loadout, to making the ranking fair. In other cases, the user account may choose the loadout most favorable to that user account. In a case where a user account may not have the loadout that is required for the replayable activity, the user account may have the option to purchase that loadout, before or after gameplay of the replayable activity. Furthermore, during gameplay, an overlay may be generated for the user account. The overlay may display completion information regarding the replayable activity.

A first set of data associated with the gameplay of the replayable activity may be received (506). The first set of data may be received directly from a respective interactive content source server. Alternatively or in addition to, one or more first object files may be received, where the one or more object files are associated with the replayable activity and comprise object data collected by the respective interactive content source server. The one or first object files may be recorded through the object recorder external to the interactive content source server. The one or more first object files may be associated with activities designated by the interactive content title 230 and may include timestamps associated with at least one of activity identifications, activity results, and gameplay characteristics.

Alternatively or in addition to, the interactive content source servers may be provided options to add other replayable activities and associated rewards specific to each interactive content title 230. In doing so, one or more second object files that may be recorded through the object recorder, or obtained directly from the interactive content title 230, may be received. The one or more second object files may comprise associated object data collected by the interactive content source server. One or more replayable activities specific to the interactive content title 230 may be generated, where the one or more second object files are used for determining scores for the one or more replayable activities.

In addition, an option for the associated user account to create and add their own replayable activities and associated rewards specifics to the interactive content title 230 may be provided via a graphical user interface associated with the associated user account. The associated user account may be provided various settings to choose and create their own replayable activities, such as a goal or tasks, how to score, what loadouts are allowed, etc. The associated user account may create the replayable activity as a private replayable activity shared among friends or as a public replayable activity that any user account may challenge.

A score may be determined (508) based on the first set of data associated with the gameplay by an associated user account. The associated user account may be placed (510) in a ranking based on scores of the other user accounts and respective sets of data associated with the replayable activity for the interactive content title 230. The score may be determined based on a time-based completion of the replayable activity, which may be calculated based on the first set of data. Alternatively or in addition to, the score may be determined by the amount of points earned while completing certain tasks in a timed framework. Alternatively or in addition to, the score may be determined based on the different loadouts such that the more difficult it is to accomplish certain missions or tasks with certain loadouts, the more points is earned. The ranking may be associated and/or change between a global ranking and a ranking between friends or other user accounts of similar game proficiency. In addition, a playback may be generated for the gameplay by the associated user account where the playback may display data regarding controller inputs synchronous to the gameplay upon completion of the gameplay of the replayable activity.

Figure 6:
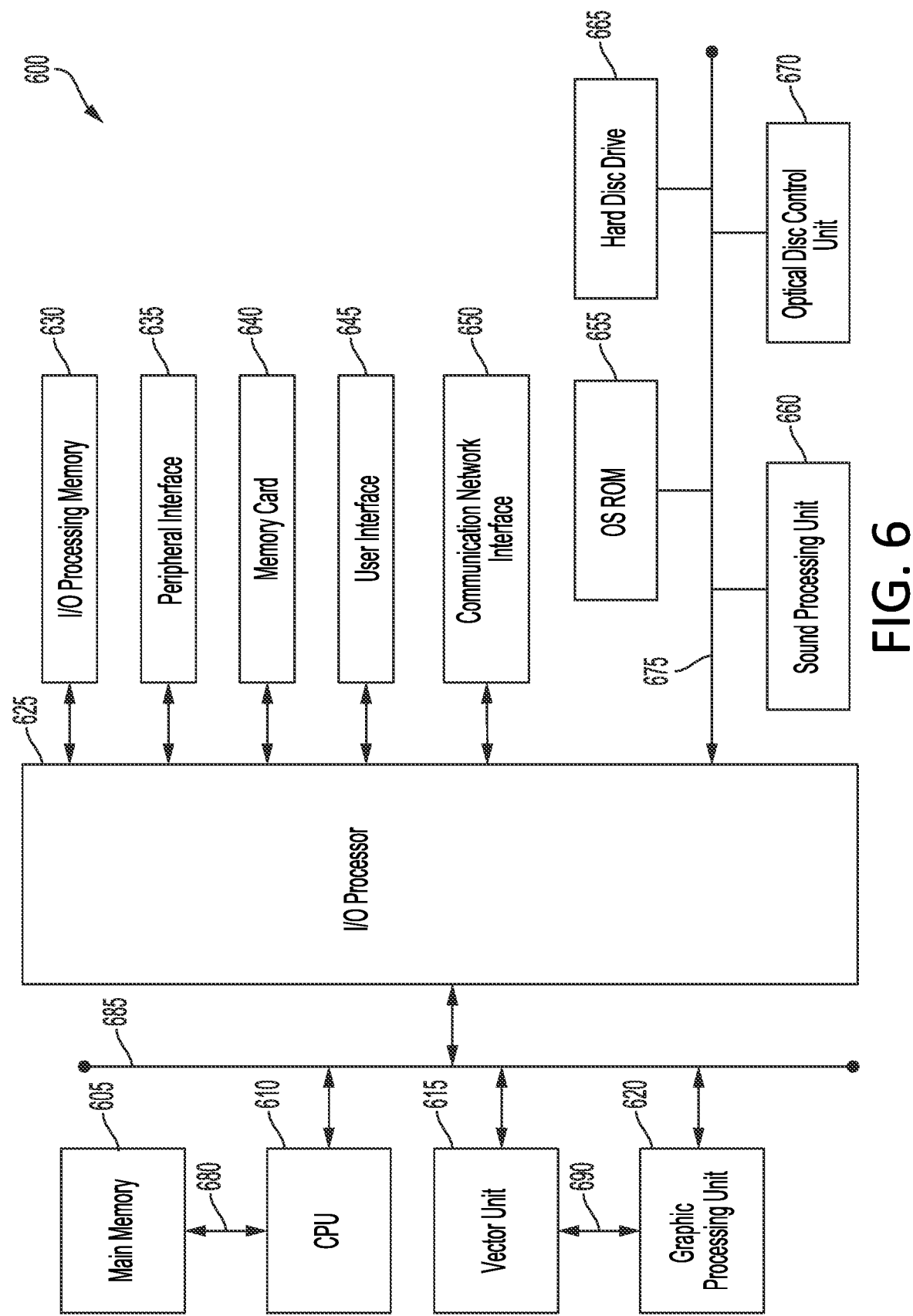
FIG. 6 illustrates an example electronic entertainment system that may be used in media-object binding and displaying real-time play data for a streaming media based on one or more objects displaying therein, according to an aspect of the present disclosure.

FIG. 6 is an example user electronic entertainment system that may be used in launching interactive content and providing dynamic interfaces, according to an aspect of the present disclosure. The entertainment system 600 of FIG. 6 includes a main memory 605, a central processing unit (CPU) 610, vector unit 615, a graphics processing unit 620, an input/output (I/O) processor 625, an I/O processor memory 630, a peripheral interface 635, a memory card 640, a Universal Serial Bus (USB) interface 645, and a communication network interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 4G, LTE, 1G, and so forth). The I/O processor 625 of FIG. 6 primarily controls data exchanges between the various devices of the entertainment system 600 including the CPU 610, the vector unit 615, the graphics processing unit 620, and the peripheral interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 645, and the communication network interface 650 such as wireless transceivers, which may also be embedded in the system 600 or as a part of some other component such as a processor.

A user of the entertainment system 600 of FIG. 6 provides instructions via the peripheral interface 635 to the CPU 610, which allows for use of a variety of different available peripheral devices (e.g., controllers) known in the art. For example, the user may instruct the CPU 610 to store certain game information on the memory card 640 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A computer-implemented method of creating replayable activities for interactive content titles, the computer-implemented method comprising:
   storing, in memory of an object server, one or more first object files recorded by an object recorder during play of an interactive content title, each of the one or more first object files associated with an activity of the interactive content title;
   receiving input selecting one or more settings from an associated user account, the selected settings applicable to customizing the activity of the interactive content title and specifying one or more loadouts;
   querying the object server for a set of data associated with the one or more settings selected by the associated user account, the set of data being queried from among a plurality of files recorded regarding the interactive content title;
   creating a custom replayable activity of the interactive content title that is defined by the set of data received based on the selected settings, wherein the custom replayable activity includes the one or more loadouts specified by the selected settings, and wherein the custom replayable activity is made available for play by one or more other user accounts;
   presenting one of the other user accounts with one or more loadout options in accordance with the selected settings, wherein the loadout options include an option to obtain one of the loadouts if the other user account does not have the loadout; and
   loading one of the loadouts for play of the custom replayable activity by the other user account, wherein a same or different loadout is loaded for play of the custom replayable activity in accordance with the settings selected by the associated user account and one or more loadout options selected by the other user account.

2. The computer-implemented method of claim 1, further comprising unlocking the custom replayable activity for challenge invitations once the associated user account has completed one or more tasks associated with the custom replayable activity in the interactive content title.

3. The computer-implemented method of claim 1, wherein the selected settings specify how to score the custom replayable activity within the interactive content title, and further comprising determining a score for the associated user account in accordance with the selected settings and the set of data indicating a completion of the custom replayable activity.

4. The computer-implemented method of claim 1, further comprising generating a ranking associated with the same loadout for the custom replayable activity, wherein the ranking can change between a global ranking and a friends ranking between friends of the associated user account.

5. The computer-implemented method of claim 3, wherein the selected settings further specify that the custom replayable activity is scored further based on a difficulty associated with the loaded loadout.

6. The computer-implemented method of claim 1, further comprising generating a replayable activities menu that displays a set of replayable activities available to the associated user account from the interactive content title and at least another interactive content title.

7. The computer-implemented method of claim 1, further comprising sending a notification to a device associated with the other user account to play the custom replayable activity.

8. The computer-implemented method of claim 7, wherein the notification is sent automatically.

9. The computer-implemented method of claim 7, further comprising generating a combined gameplay view including a first gameplay view associated with the associated user account and a second gameplay view associated with the other user account, wherein the combined gameplay view is a playback or displayed synchronously in real time.

10. The computer-implemented method of claim 1, wherein the input from the associated user account specifies that the custom replayable activity is private to the other user accounts designated as friends.

11. The computer-implemented method of claim 1, further comprising receiving the one or more first object files associated with the custom replayable activity, wherein the one or more first object files are associated with activities designated by the interactive content title and include timestamps associated with at least one of activity identifications, activity results, and gameplay characteristics.

12. The computer-implemented method of claim 11, further comprising:
   receiving one or more second object files recorded through the object recorder, the one or more second object files comprising associated object data collected by an interactive content source server, and wherein the object recorder is external to the interactive content source server; and
   generating one or more replayable activities specific to the interactive content title, wherein the one or more second object files are used for determining scores for the one or more replayable activities.

13. The computer-implemented method of claim 1, further comprising providing options to create custom replayable activities and associated rewards specific to the interactive content title, wherein the selected settings are selected from the options.

14. The computer-implemented method of claim 1, wherein the selected settings specify how to score one or more tasks within the custom replayable activity.

15. The computer-implemented method of claim 1, wherein the selected settings specify what loadouts are allowed for the custom replayable activity.

16. The computer-implemented method of claim 1, further comprising generating an overlay during gameplay of the custom replayable activity for the associated user account, wherein the overlay displays one or more objectives and completion information regarding the custom replayable activity.

17. A system comprising:
one or more processors; and
at least one memory having instructions stored thereon, that when executed the instructions are effective to cause the one or more processors to:
- store, in memory of an object server, one or more first object files recorded by an object recorder during play of an interactive content title, each of the one or more first object files associated with an activity of the interactive content title;
- receive input selecting one or more settings from an associated user account, the selected settings applicable to customizing the activity of the interactive content title and specifying one or more loadouts;
- query the object server for a set of data associated with the one or more settings selected by the associated user account, the set of data being queried from among a plurality of files recorded regarding the interactive content title;
- create a custom replayable activity of the interactive content title that is defined by the set of data received based on the selected settings, wherein the custom replayable activity includes the one or more loadouts specified by the selected settings, and wherein the custom replayable activity is made available for play by one or more other user accounts;
- present one of the other user accounts with one or more loadout options in accordance with the selected settings, wherein the loadout options include an option to obtain one of the loadouts if the other user account does not have the loadout; and
- load one of the loadouts for play of the custom replayable activity by the other user account, wherein a same or different loadout is loaded for play of the custom replayable activity in accordance with the settings selected by the associated user account and one or more loadout options selected by the other user account.

18. A non-transitory computer readable storage medium comprising instructions stored thereon, when executed the instructions are effective to cause a system to:
- store, in memory of an object server, one or more first object files recorded by an object recorder during play of an interactive content title, each of the one or more first object files associated with an activity of the interactive content title;
- receive input selecting one or more settings from an associated user account, the selected settings applicable to customizing the activity of the interactive content title and specifying one or more loadouts;
- query the object server for a set of data associated with the one or more settings selected by the associated user account, the set of data being queried from among a plurality of files recorded regarding the interactive content title;
- create a custom replayable activity of the interactive content title that is defined by the set of data received based on the selected settings, wherein the custom replayable activity includes the one or more loadouts specified by the selected settings, and wherein the custom replayable activity is made available for play by one or more other user accounts;
- present one of the other user accounts with one or more loadout options in accordance with the selected settings, wherein the loadout options include an option to obtain one of the loadouts if the other user account does not have the loadout; and
- load one of the loadouts for play of the custom replayable activity by the other user account, wherein a same or different loadout is loaded for play of the custom replayable activity in accordance with the settings selected by the associated user account and one or more loadout options selected by the other user account.

19. The computer-implemented method of claim 1, wherein the loadout options include different loadouts specified by the selected settings, and further comprising receiving a selection from the other user account regarding one of the different loadouts within the presented loadout options.

20. The computer-implemented method of claim 1, further comprising:
- storing, in the memory of the object server, a set of content title data associated with a plurality of interactive content titles, wherein the plurality of interactive content titles includes the interactive content title; and
- querying the object server for the content title data associated with the interactive content title.

* * * * *